(12) United States Patent  
Ee et al.

(10) Patent No.: US 6,545,833 B1
(45) Date of Patent: Apr. 8, 2003

(54) METHOD TO ELIMINATE REASSIGNMENTS

(75) Inventors: Chwee Fern Ee, Singapore (SG); Yong Peng Chng, Singapore (SG); Chew Boon Toh, Singapore (SG); Wing Hung Chan, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/561,221

(22) Filed: Apr. 28, 2000

Related U.S. Application Data

(60) Provisional application No. 60/132,988, filed on May 7, 1999.

(51) Int. Cl.[7] .................................................. G11B 5/09
(52) U.S. Cl. ........................................ 360/53; 714/710
(58) Field of Search ................................ 360/53, 54, 49, 360/48; 714/7, 8, 710, 711, 723, 769, 770; 711/4, 201, 202, 205, 206, 207, 209, 221

(56) References Cited

U.S. PATENT DOCUMENTS

| | | |
|---|---|---|
| 4,935,825 A | 6/1990 | Worrell et al. |
| 5,062,091 A | 10/1991 | Maeda et al. |
| 5,075,804 A | 12/1991 | Deyring |
| 5,216,631 A | 6/1993 | Sliwa, Jr. |
| 5,237,553 A | 8/1993 | Fukushima et al. |
| 5,271,018 A | 12/1993 | Chan |
| 5,313,585 A | 5/1994 | Jeffries et al. |
| 5,313,626 A | 5/1994 | Jones |
| 5,523,903 A | 6/1996 | Hetzler et al. |
| 5,563,746 A | 10/1996 | Bliss |
| 5,600,662 A | 2/1997 | Zook |
| 5,768,044 A | 6/1998 | Hetzler et al. |
| 5,822,142 A | 10/1998 | Hicken |
| 5,937,435 A | 8/1999 | Dobbek et al. |
| 6,094,317 A | * 7/2000 | Chung .................. 360/53 |
| 6,101,619 A | * 8/2000 | Shin .................... 369/32 |

* cited by examiner

*Primary Examiner*—Alan Faber
(74) *Attorney, Agent, or Firm*—Derek J. Berger; David K. Lucente

(57) ABSTRACT

A disc drive typically contains at least one disc which is divided into sectors. The method of eliminating reassignments involves copying data stored at one sector (referred to as a moving sector) to another sector (referred to as a moving spare), and assigning the logical address associated with the moving sector to the moving spare. The elimination process is repeated until the reassignments are eliminated. Verification of the data copied is conducted to ensure data integrity. Furthermore, the elimination process is preferably executed only when the disc drive is in an idle mode. Records are kept and updated as the process is carried out so that the process can be continued even if interrupted.

21 Claims, 9 Drawing Sheets

METHOD TO ELIMINATE REASSIGNMENTS

This patent application claims priority from U.S. Provisional Application No. 60/132,988, filed May 7, 1999.

FIELD OF INVENTION

The present invention relates generally to disc drives, and more particularly to the mapping of defective sectors in disc drives.

BACKGROUND OF THE INVENTION

In a disc drive, data is stored on discs. Concentric tracks are defined on each surface of the discs, and each track is further divided into a number of sectors. Each sector represents an addressable location for storing a block of data.

During the manufacturing process, some sectors may be damaged so that data cannot be stored or retrieved from these sectors. Tests are therefore conducted as part of the manufacturing process to determine the validity of each sector. A sector with defects (referred to as "factory defects") is not allocated a valid address and therefore will not be utilized. For example, if a particular sector which should be allocated an address of 3 is found to be a defective sector, it is skipped over such that the next sector acquires the address 3. Since the defective sector is not assigned a valid address, data will not be stored in that sector.

When the disc is placed into service, additional sectors on the disc may become defective. Such sectors are referred to in this document as grown defect sectors. One conventional method of dealing with grown defects is to reassign the logical address of the grown defect sector to another sector. For example, a particular sector with the address 4 in Track 1 is found to have a grown defect. The address 4 will be reassigned to a replacement sector usually found on another track, for example, in Track 2. This reassignment of the address is recorded by the controller of the disc drive. In operation, the sectors are read in sequential order of the addresses, therefore the read operation will be interrupted by a first seek operation as the heads move from Track 1 to Track 2 to read from the replacement sector and a second seek operation as the heads move back from Track 2 to Track 1. The movement of the heads to and from the reassigned replacement sector slows down the speed at which data can be read from or written to the discs.

There remains therefore a need for an improved method of dealing with grown defects without compromising the efficiency of the disc drive. It will be evident from the following description that the present invention offers this and other advantages.

SUMMARY OF THE INVENTION

According to one aspect of the invention, there is provided a method for eliminating reassignments in a disc drive. A disc drive typically contains at least one disc which is divided into sectors. The method of eliminating reassignments involves copying data stored at one sector (referred to as a moving sector) to another sector (referred to as a moving spare), and assigning the logical address associated with the moving sector to the moving spare.

The elimination process is repeated until the reassignments are eliminated. Verification of the data copied is conducted to ensure data integrity. Furthermore, the elimination process is preferably executed only when the disc drive is in an idle mode. Records are kept and updated as the process is carried out so that the process can be continued even if interrupted.

In another aspect of the invention, there is provided a disc drive with a controller which is configured to perform the steps as described above.

DETAILED DESCRIPTION

A preferred embodiment of the present invention is described in the following with reference to the drawings.

Figure 1:
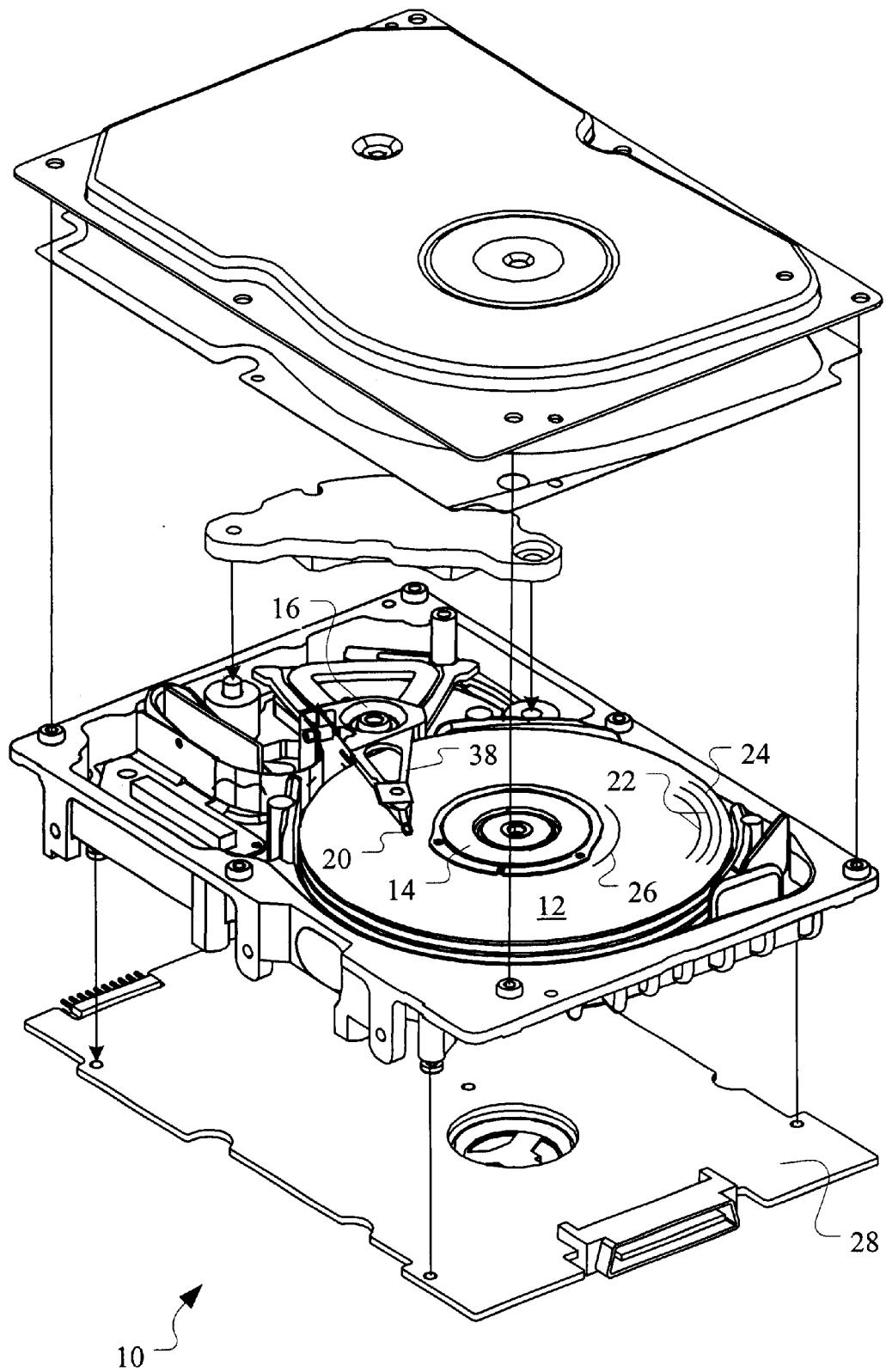
FIG. 1 is a drawing of a disc drive.

In a disc drive 10 as shown in FIG. 1, there is a number of discs 12 mounted on a spindle motor 14 for rotational motion. An actuator 16 typically extends into a series of actuator arms 18, each of which holds out at least one head 20 such that each head reads from or writes to one surface of the discs. Each head itself may be a composite of at least two devices, one for reading data and one for writing data.

Each surface of a disc is divided into concentric tracks 22 which are further divided into sectors, each sector being an addressable location which can hold data. A head 20 which is held stationary whilst the disc 12 is rotated will read sectors along a particular track 22. For the head 20 to read a sector belonging to another cylinder, a seek operation has to take place. This involves the actuator 16 coming into operation and moving the actuator arm 18 to reposition the head 20 relative to the disc 12. Data retrieval is therefore more efficient when data is stored in physically consecutive sectors which have consecutive logical addresses.

The sectors are usually assigned logical addresses in a sequential order, from the outermost track 24 to the innermost track 26. However, when a grown defect is detected in a sector, the logical address of this grown defect sector will be reassigned to a spare sector. This is referred to as a reassignment, and the spare sector is referred to as a replacement sector. Typically, spare sectors are randomly located in clusters and not always at the end of each track. Therefore, a replacement sector is usually not found on the same track as the defective sector. The disc drive controller 28 keeps track of the reassignment of the logical addresses, for example, by updating a defect table with any such changes.

Figure 2:
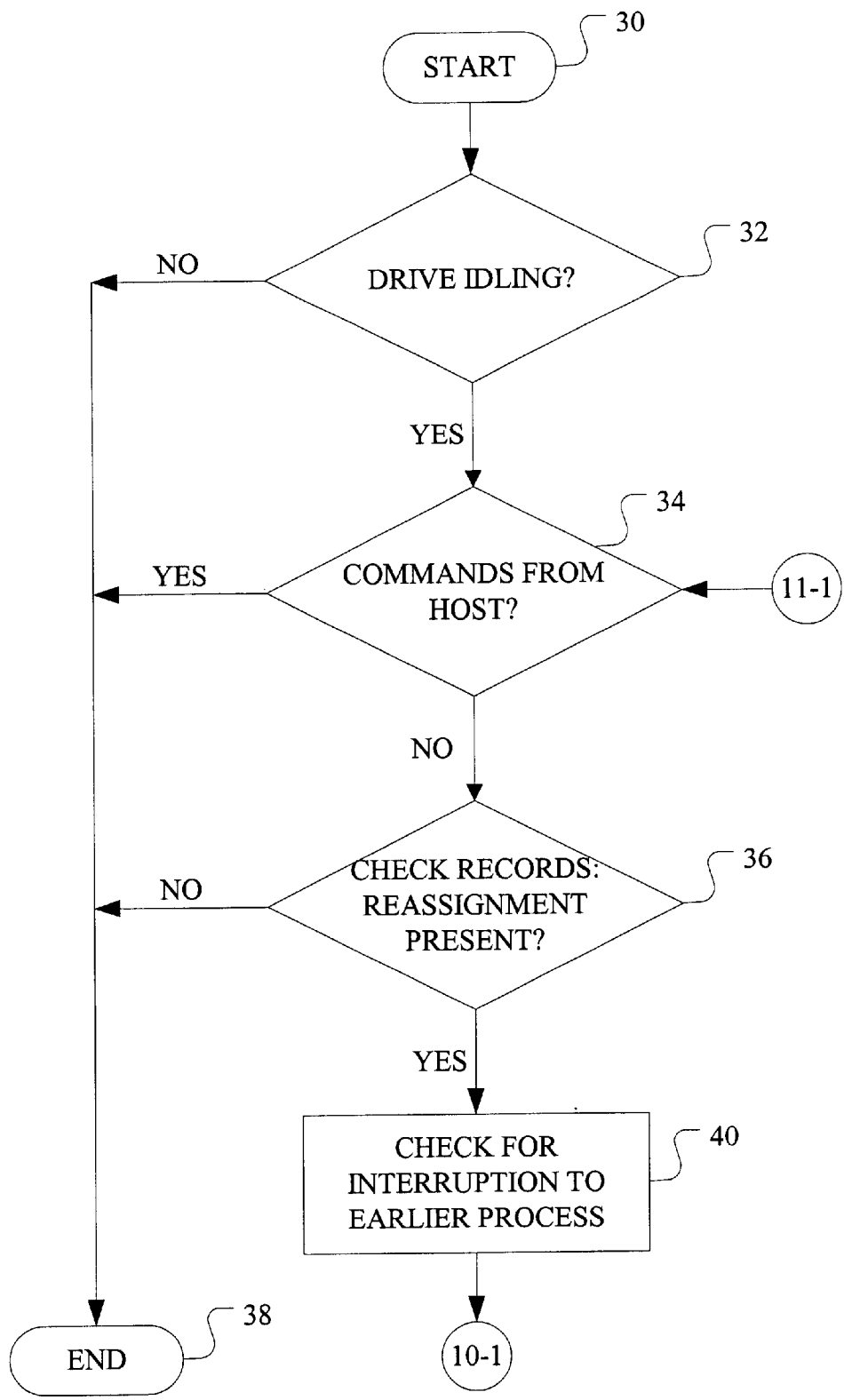
FIGS. 2 to 3 show a flowchart of a process according to a preferred embodiment of the present invention.
Figure 3:
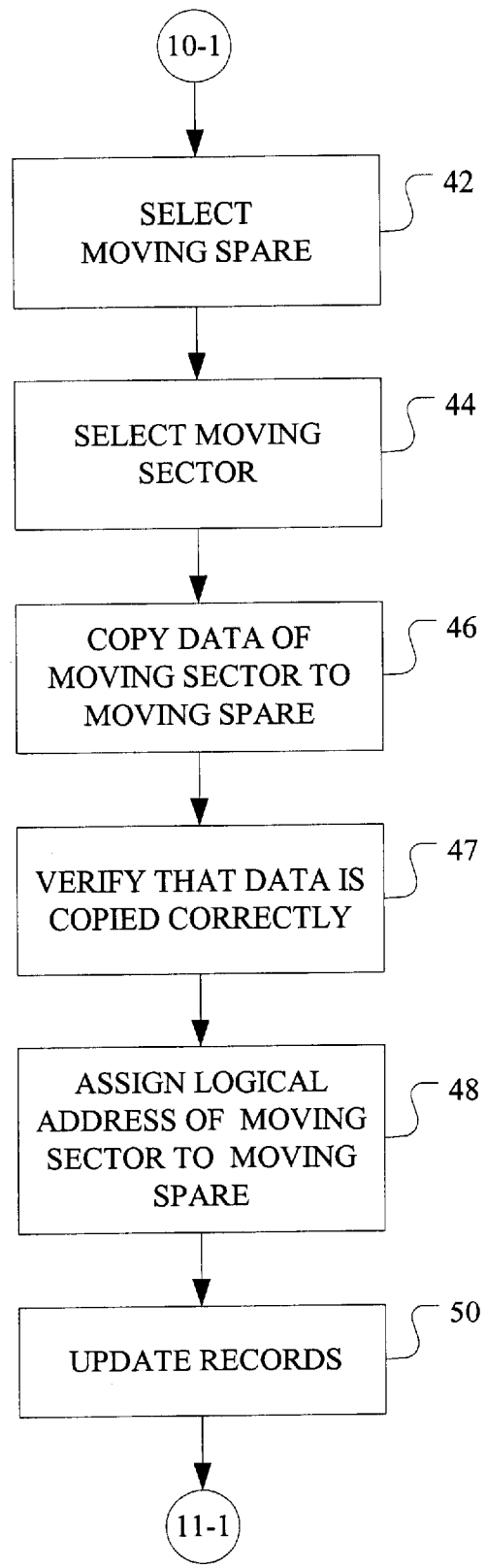

Making reference to FIG. 2, a process to eliminate reassignments is initiated 30 when the disc drive has been idle for a period of time 32. The disc drive checks for new commands from an associated host system 34, and if there is none, it proceeds to check its records to see if there are any reassignments 36. If the disc drive is not idle, or if there are new commands from the host, or if there are no reassignments, the process is terminated or not carried out 38. If there are reassignments, the records are checked for an earlier elimination process which was interrupted 40. As shown in FIG. 3, if an earlier process was interrupted, the earlier process is continued by selecting the earlier selected moving spare and a corresponding moving sector. Otherwise, a new moving spare and a corresponding moving sector is selected 42, 44.

Data in the moving sector is copied to the moving spare 46. Preferably, the data that is copied is read back to verify that it has been copied correctly 47. The logical address of the moving sector is assigned to the physical address of the moving spare 48. The controller keeps track of these changes by updating its records 50. In this manner, it will appear as though the moving spare has moved from its original physical location to the original physical location of the moving sector.

The steps 34 to 50 are repeated until an interruption from the host system is detected or until no reassignments are left. As the records are updated after every moving step, the process to eliminate the same reassignment can be continued even after an interruption.

Figure 4:
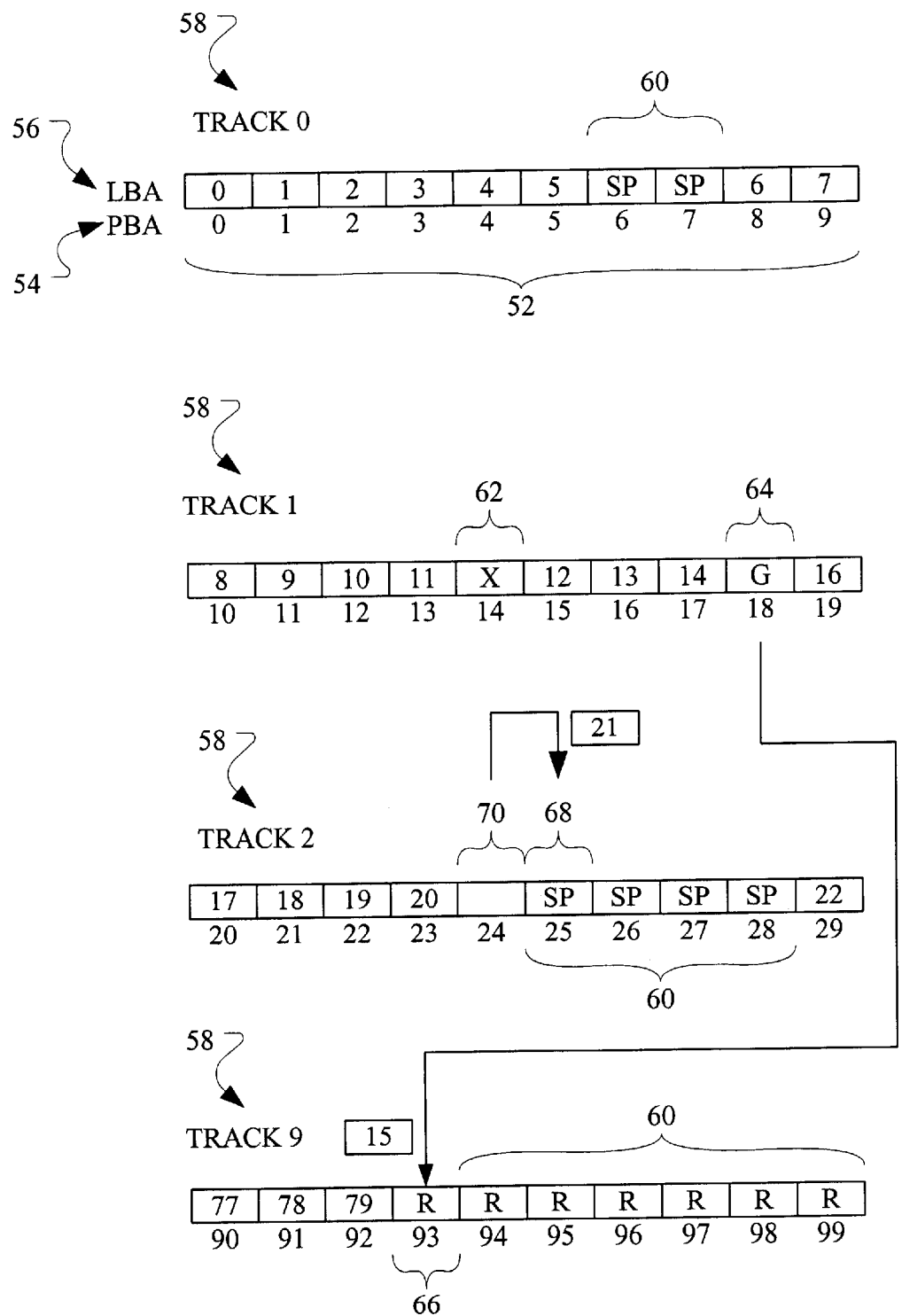
FIG. 4 illustrates the reassignment of the logical address of a grown defect sector to the physical address of a spare sector.

Sectors 52 are shown in the diagram of FIG. 4 with their respective physical block addresses (PBA) 54 and logical block addresses (LBA) 56. For the purpose of illustration, four tracks 58 of ten sectors 52 each are shown: Track 0, Track 1, Track 2 and Track 9. Corresponding to FIG. 4 is Table 1 which represents part of a defect table for keeping track of the sectors and their respective addresses.

TABLE 1

| Record Number | LBA | Slip | Reassign | Spare |
|---|---|---|---|---|
| 0 | 6 | 2 | 0 | 1 |
| 1 | 12 | 3 | 0 | 0 |
| 2 | 15 | 3 | 1 | 0 |
| 3 | 22 | 7 | 0 | 1 |

In this example, sectors PBA 6 and PBA 7 are spare sectors 60. This is reflected in Record Number 0 in Table 1. The "Reassign" flag in Record Number 1 is 0, indicating that there are no reassignments involved in this allocation of LBA. It also means that LBA 6 is allocated to the second sector from sector PBA 6 which is sector PBA 8. The "Spare" flag is 1, indicating that sectors PBA 6 and PBA 7 are spare sectors.

The "Reassign" flag is set at 0 at Record Number 1 to show that no reassignment is associated with the sector 62 which has a PBA of 14. The LBA 12 is therefore allocated to the third sector from PBA 12 which is PBA 15. A logical 0 under "Sparc" flag indicates that sector PBA 14 is a not a spare sector. This is typically how a factory defect sector is marked.

Record Number 2 is an example of how a grown defect sector 64 is flagged. In the example shown in FIG. 4, the sectors PBA 93 to PBA 99 are spare sectors 61 originally set aside for use as replacement sectors. The LBA 15 is originally meant to be allocated to the third sector from PBA 15, but instead is reassigned to another sector 66 (PBA 93) because of the presence of at least one grown defect in sector PBA 18. The "Reassign" flag is set at 1 to indicate this reassignment.

For the purpose of illustrating a method of eliminating reassignments according to the present invention, four spare sectors 60 are shown to be located at Track 2 from PBA 25 to PBA 28. This is reflected in Record Number 3 of Table 1.

From its records, the controller will be able to identify the presence of a reassignment. In selecting a sector to be the moving spare, it preferably chooses the spare sector nearest to the grown defect sector. In comparison with sector PBA 7 in Track 0, sector PBA 25 in Track 2 is the nearest spare sector to sector PBA 18 in Track 1. Thus, the sector 68 (PBA 25) is selected to be the moving spare. This status of the elimination process is stored in the records and illustrated in Table 2 below.

The "Direction" flag in Table 2 is used to indicate the direction in which the moving spare is to be "moved". In this example, the "Direction" flag is set to "−1" to indicate a move in the decrementing order of the PBA such that the moving spare is moved towards the grown defect sector.

TABLE 2

| Reassign PBA | Move PBA | Direction |
|---|---|---|
| 18 | 25 | −1 |

Figure 5:
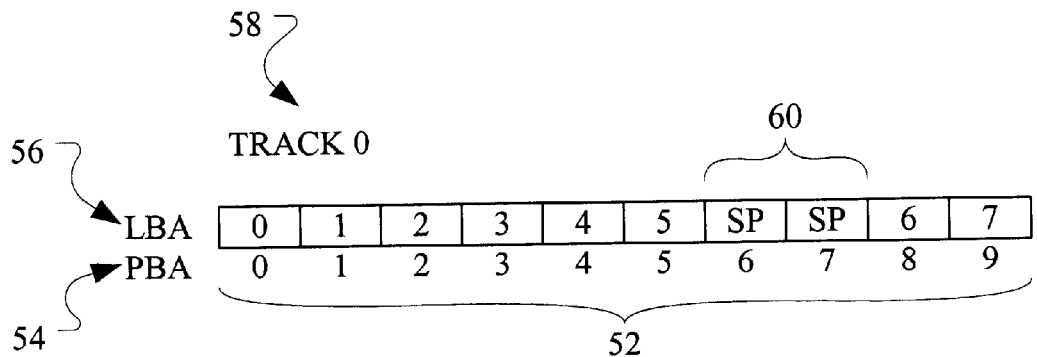
FIG. 5 shows a method of moving a spare sector sector-by-sector in one direction.
Figure 5:
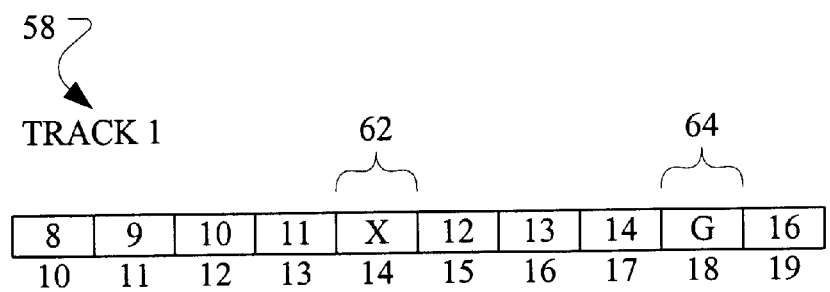
Figure 5:
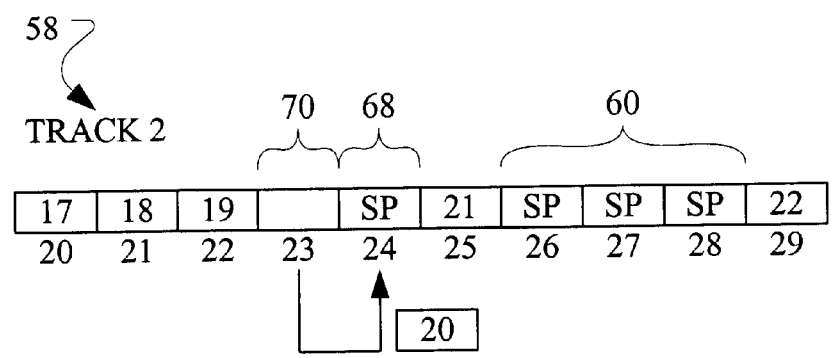
Figure 5:
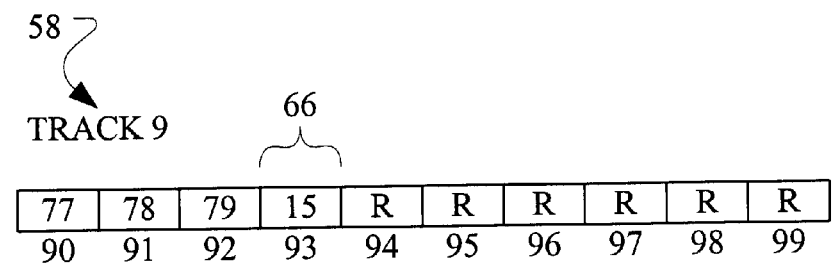

In this example, sector 70 (PBA 24 and LBA 21) is chosen to be the moving sector. Data in sector PBA 24 is copied to sector PBA 25, and the logical address LBA 21 is allocated to PBA 25. The result is as shown in FIG. 5. Table 3 shows that the replacement sector still exists (Record Number 2) and it also shows a new entry (Record Number 3) for the moved spare. The status is updated as shown in Table 4.

TABLE 3

| Record Number | LBA | Slip | Reassign | Spares |
|---|---|---|---|---|
| 0 | 6 | 2 | 0 | 1 |
| 1 | 12 | 3 | 0 | 0 |
| 2 | 15 | 3 | 1 | 0 |
| 3 | 21 | 4 | 0 | 1 |
| 4 | 22 | 7 | 0 | 1 |

TABLE 4

| Reassign PBA | Move PBA | Direction |
|---|---|---|
| 18 | 24 | −1 |

Therefore, to continue the elimination process for the same grown defect sector, in the next moving step, the sector PBA 24 is chosen to be the moving spare 68 and the sector PBA 23 is chosen to be the moving sector 70.

Figure 6:
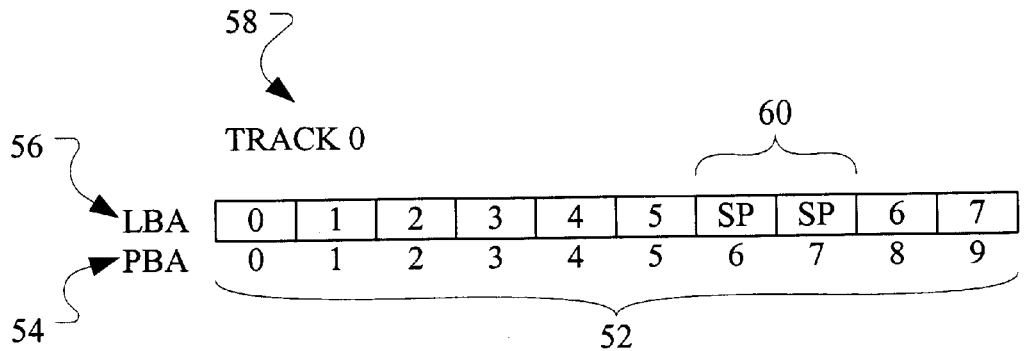
FIG. 6 shows the sectors after the moving step of FIG. 5.
Figure 6:
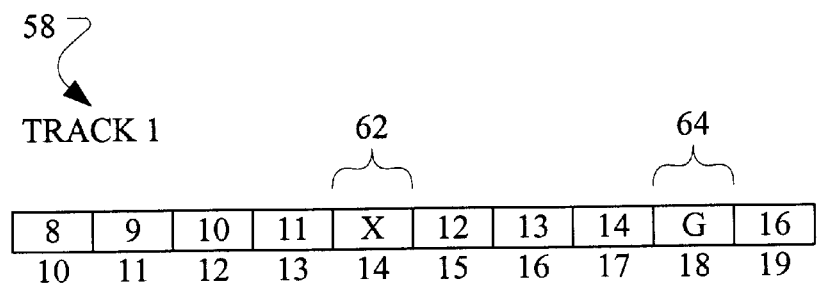
Figure 6:
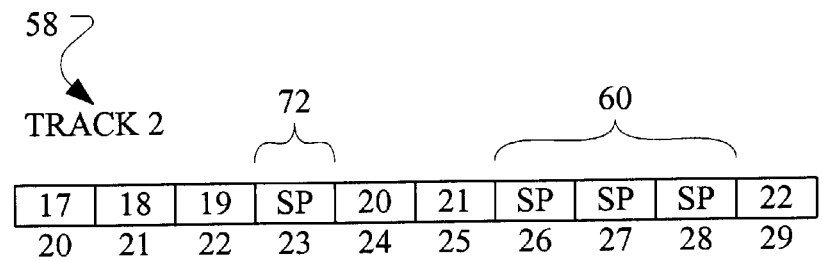
Figure 6:
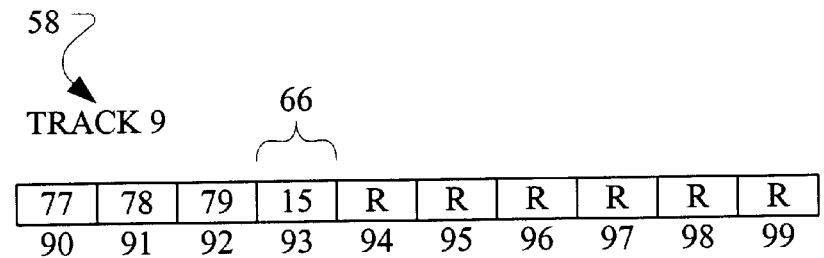

If the elimination process is interrupted after the moving step shown in FIG. 5, the status records will indicate how the process is to be continued. One example of such status records is as shown in Table 5. The controller will find the sectors in the configuration shown in FIG. 6, and therefore select sector 72 (PBA 23) to be the moving spare. From an alternative perspective, the controller will find from its records that it was previously in the process of eliminating the reassignment associated with grown defect sector PBA 18, and upon continuation of the process will select the spare sector nearest to sector PBA 18 to be the moving spare.

TABLE 5

| Reassign PBA | Move PBA | Direction |
|---|---|---|
| 18 | 23 | −1 |

Figure 7:
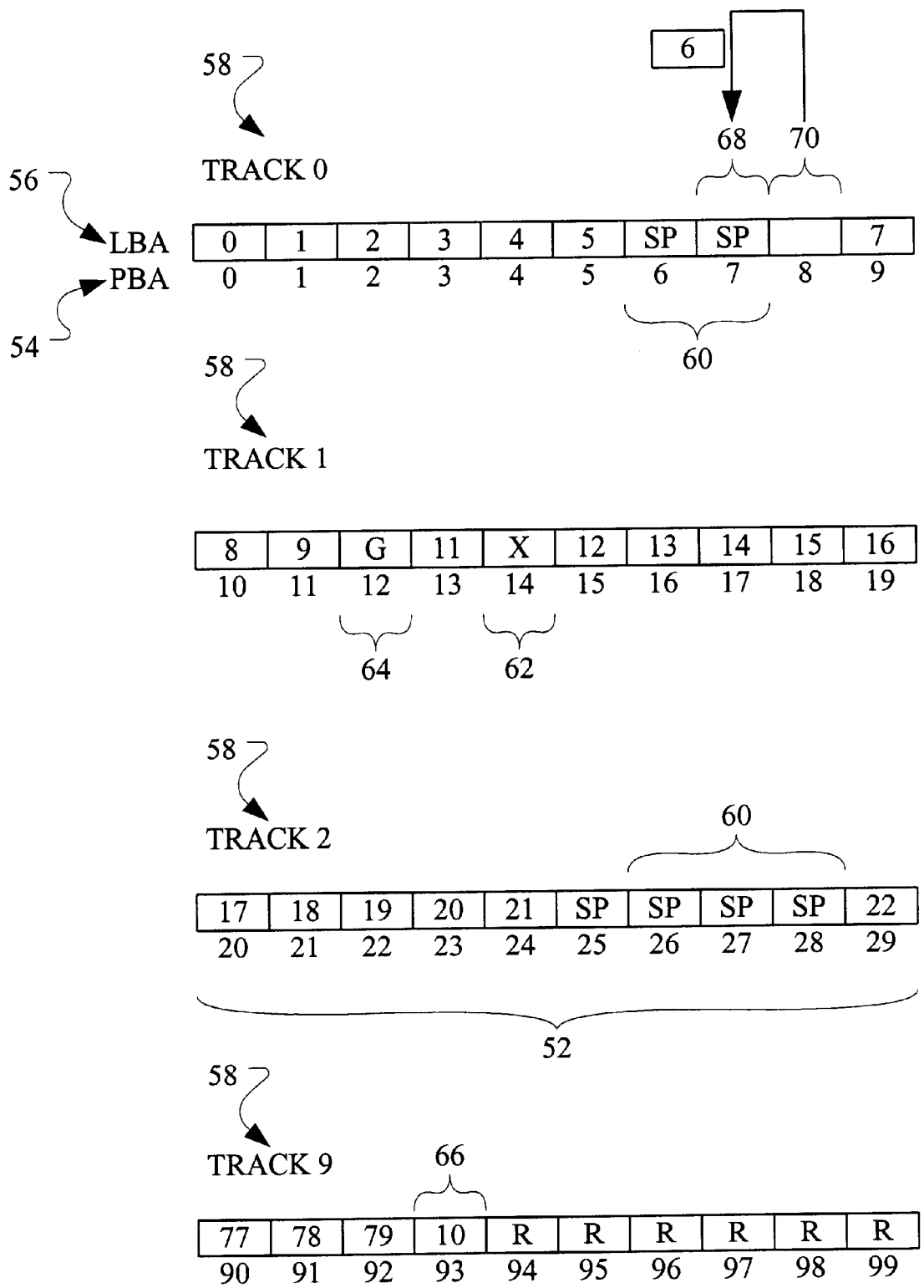
FIG. 7 shows a method of moving a spare sector in the opposite direction.

FIG. 7 shows another possibility where the nearest spare sector to the grown defect sector 64 (PBA 12) is the sector 68 (PBA 7). In such a case, the sector PBA 7 will preferably be chosen as the moving spare and the sector 70 (PBA 8) will be chosen as the moving sector. Table 6 shows how a defect table for this situation may be constructed, and Table 7 shows how the status records indicates a move in the opposite direction to the previous example. In this example, the "Direction" flag in Table 7 is set to "1" to indicate a move in the incrementing order of the PBA.

TABLE 6

| Record Number | LBA | Slip | Reassign | Spares |
|---|---|---|---|---|
| 0 | 6 | 2 | 0 | 1 |
| 1 | 12 | 3 | 0 | 0 |
| 2 | 10 | 3 | 1 | 0 |
| 4 | 22 | 7 | 0 | 1 |

TABLE 7

| Reassign PBA | Move PBA | Direction |
|---|---|---|
| 12 | 7 | 1 |

Most preferably, a single sector next to the selected moving spare is chosen to be the moving sector. For example, in FIG. 7, the moving sector is chosen to be sector 70 (PBA 8) when the moving spare is chosen to be sector 68 (PBA 7). If this neighboring sector does not have a valid LBA, the next neighboring sector will be chosen, and so forth. This is so that the drive does not have to set aside a significant memory space to hold the data which is to be copied during the moving step.

Figure 8:
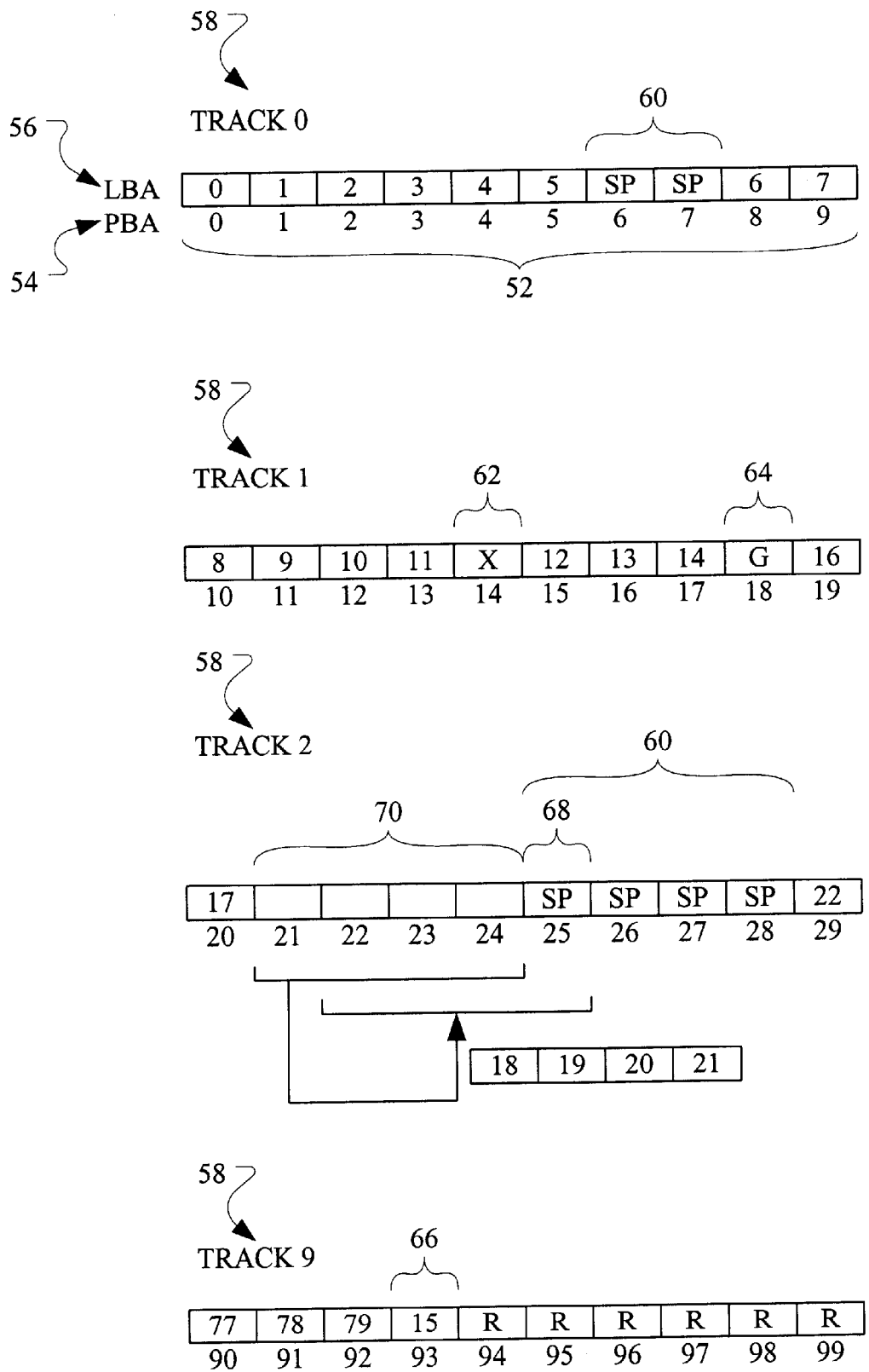
FIG. 8 shows a method of moving a spare sector by a certain number of sectors.

In an alternative embodiment, more than one sector can be chosen to be moving sectors. This is described with reference to FIG. 8. For the purpose of illustration, supposing the moving sectors are chosen to be the sectors 70 from PBA 21 to PBA 24, and the selected moving spare 68 is sector PBA 25. Data in sectors PBA 21 to PBA 24 will be copied to a temporary storage in the cache. The logical addresses of sectors PBA 21 to PBA 24 (LBA 18 to LBA 21) are then allocated to sectors PBA 22 to PBA 25 respectively. The next sector to be chosen as the moving spare will accordingly be the sector PBA 21.

Figure 9:
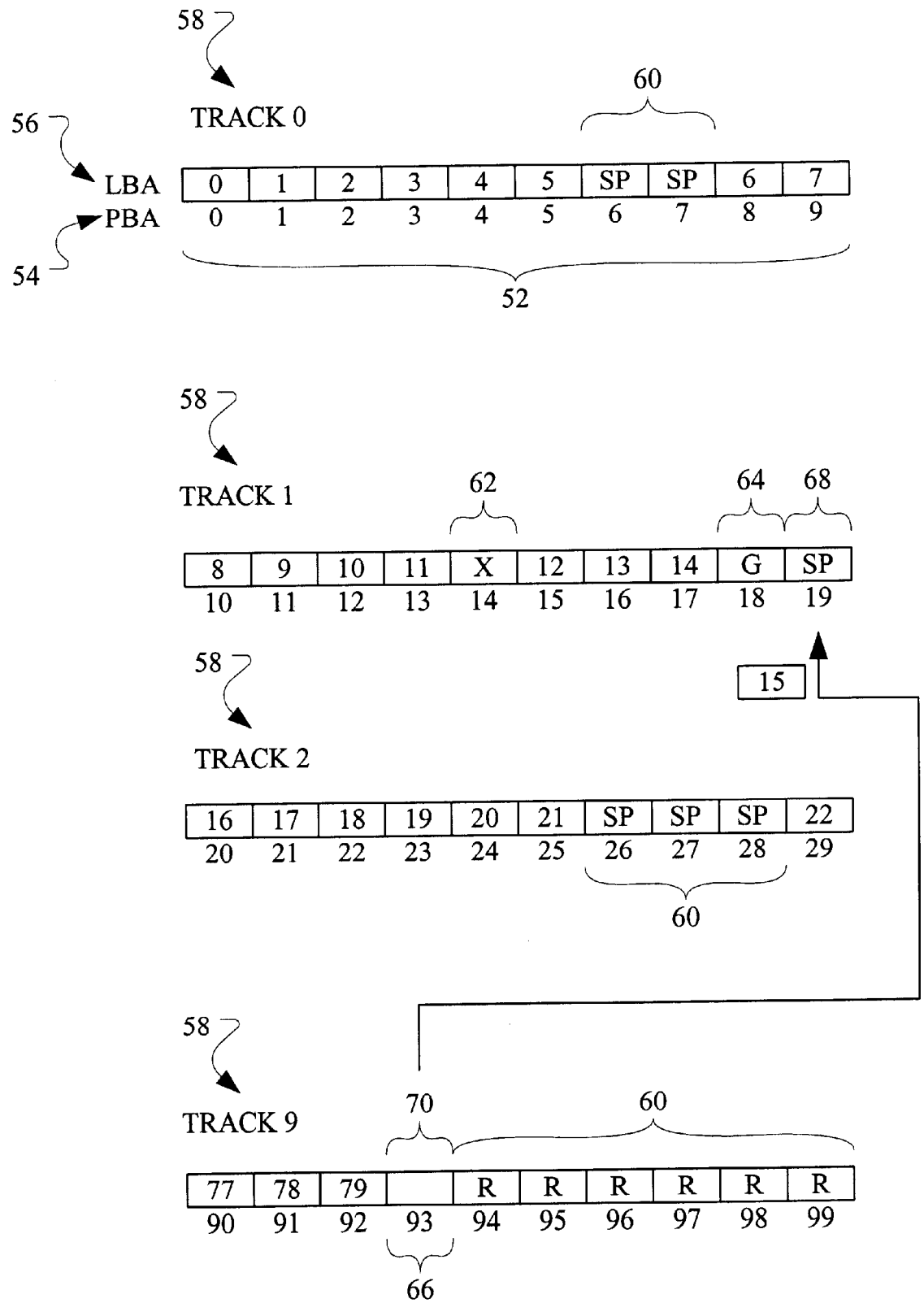
FIG. 9 shows the last moving step in a process of eliminating a reassignment.

To continue the example of FIG. 5, the last moving step of the elimination process is shown in FIG. 9. The selected moving spare is sector 68 (PBA 19). This time, the selected moving sector is the grown defect sector 64 (PBA 18) which had its logical address LBA 15 reassigned to the replacement sector 66. Data is now copied from LBA 15 to the sector PBA 19, and the LBA 15 is allocated to PBA 19. After this step, the logical addresses are allocated to the sectors in sequential order. At the same time, the sector PBA 93 is freed up for future reassignments, and is flagged as one of the spare sectors 61. In this way, the number of reassignments can be prevented from building up.

Table 8 gives a representation of the records after such a step has been executed. As shown, the sector LBA 15 no longer shows a reassignment to a replacement sector. Accordingly, when a check for the existence of replacement sectors indicates that none of the records has the "Reassign" flag set at "1", the elimination process stops.

TABLE 8

| Record Number | LBA | Slip | Reassign | Spares |
|---|---|---|---|---|
| 0 | 6 | 2 | 0 | 1 |
| 1 | 12 | 3 | 0 | 0 |
| 2 | 15 | 4 | 0 | 0 |
| 3 | 22 | 7 | 0 | 1 |

If other reassignments exist, the corresponding records will have the "Reassign" flag set at "1", and the drive will select one of these reassignments to eliminate.

It has thus been shown in the foregoing that the process to eliminate replacement sectors can be performed in the background without affecting the normal operations of the disc drive. Furthermore, by eliminating reassignments, replacement sectors can be prevented from building up in a disc drive and therefore prevent performance degradation of the disc drive due to a build up of replacement sectors. The speed of data access in the disc drive is also improved since the number of seek operations will be reduced if there are fewer or less reassignments.

Alternatively, embodiments of the invention may be described as follows:

The invention is applicable to a disc drive 10 containing at least one disc 12 which is divided into memory locations 52. It involves a method of eliminating reassignments 36 by copying data stored at the logical address 56 of a second memory location 70 to the first physical address 54 of a first memory location 68. The logical address 56 of the second memory location 70 is also assigned to the first physical address 54 of a first memory location 68.

The method preferably includes verifying the data copied 47. Records are kept 50 of the process executed, and this may involve keeping records to indicate the first physical address of the first memory location 68 selected, the logical address of the second memory location 70 selected, and indications of the assignment of the logical address 56 of the second memory location 70 to the first physical address 54 of the first memory location 68. By checking the records 40, an appropriate physical address and a logical address can be selected 42, 44.

The method may further include steps of checking whether the disc drive is idle 32 and carrying out the process of eliminating reassignments only when the disc drive is idle. It may also include checking for presence of reassignments in the disc drive 36, and carrying out the process only if there is at least one reassignment. Furthermore, the method may include checking for commands from a host to the disc drive 34, and continuing with the process of eliminating reassignments only if there are no commands.

The first memory location 68 may be a spare memory location 60, and more preferably, it is the memory location physically nearest to a defective memory location 64.

The second memory location 70 may be a memory location with a second physical address value that is between the first physical address value of a first memory location 68 and a third physical address value of the defective memory location 64. In another situation, the second memory location 70 has the same logical address as a defective memory location 64.

In an alternative embodiment, data may be copied from the logical address of the second memory location 70 to a third memory location, and then copied from the third memory location to the physical address of the first memory location 68.

The above description is only illustrative of various embodiments of the invention, and a person skilled in the art will understand that changes can be made to the details of structure, function and processes without going beyond the scope of the present invention.

What is claimed is:

1. In a disc drive comprising at least one disc having a plurality of memory locations, a method of eliminating reassignments in the disc drive wherein the method comprises steps of:
    (a) providing a first physical address of a first memory location;
    (b) providing a logical address of a second memory location, wherein the logical address is equal to a previously reassigned logical address from a defective memory location;
    (c) copying data stored at the logical address to the first physical address; and
    (d) assigning the logical address to the first physical address.

2. A method of claim 1 further comprising a step (e) of verifying the data copied.

3. A method of claim 1 further comprising steps of
    (e) keeping records to indicate the first physical address of the first memory location selected; and
    (f) keeping records to indicate the logical address of the second memory location selected.

4. A method of claim 3 further comprising a step (g) of keeping records to indicate the assignment of the logical address to the first physical address.

5. A method of claim 4 further comprising a step (h) of checking the records to determine a first physical address and a logical address to select.

6. A method of claim 5 further comprising steps of:
    (e) checking whether the disc drive is idle; and
    (f) performing steps (a) to (h) only when the disc drive is idle.

7. A method of claim 5 further comprising steps of:
    (e) checking for presence of reassignments in the disc drive; and
    (f) performing steps (a) to (h) only if there is at least one reassignment.

8. A method of claim 5 further comprising steps of:
    (e) checking for commands from a host to the disc drive; and
    (f) performing steps (a) to (h) only if there are no commands.

9. A method of claim 1 wherein the providing step (a) includes a step (e) of selecting a spare memory location to be the first memory location.

10. A method of claim 9 wherein the step (e) further includes selecting a memory location physically nearest to a defective memory location to be the first memory location.

11. A method of claim 1 wherein the providing step (b) includes a step (e) of selecting a memory location with a second physical address that is between the first physical address and a third physical address of a defective memory location to be the second memory location.

12. A method of claim 1 wherein the copying step (c) comprises steps of:
    (e) copying data stored at the logical address to a third memory location; and
    (f) copying data from the third memory location to the first physical address.

13. A disc drive comprising:
    a disc with a plurality of memory locations;
    a first memory location on the disc, the first memory location being addressable by a physical address;
    a second memory location on the disc, the second memory location being addressable by a logical address that is equal to a previously reassigned logical address from a defective memory location; and
    a controller configured to copy data at the logical address to the physical address and to assign the logical address to the physical address.

14. The disc drive of claim 13, wherein the controller is configured to verify the copied data.

15. The disc drive of claim 13, wherein the controller is configured to perform the following steps:
    keep records to indicate the first physical address of the first memory selected; and
    keeping records to indicate the logical address of the second memory location selected.

16. The disc drive of claim 15, wherein the controller is further configured to perform the following step:
    keep records to indicate the assignment of the logical address to the first physical address.

17. The disc drive of claim 16, wherein the controller is further configured to perform the following step:
    check the records to determine a first physical address and a logical address to select.

18. The disc drive of claim 13, wherein the controller is enabled to check whether the disc drive is idle and to perform the data copy only when the drive is idle.

19. The disc drive of claim 13, wherein the controller is enabled to check for the presence of reassignments in the disc drive and to perform the data copy only if there is at least one reassignment.

20. The disc drive of claim 13, wherein the controller is enabled to check for commands from a host to the disc drive and to perform the data copy only if there are no commands.

21. A disc drive comprising:
    a defective sector;
    a replacement sector with a logical address reassigned from the defective sector; and
    means for eliminating the reassignment.

* * * * *